US012784112B2

(12) United States Patent
Harned et al.

(10) Patent No.: US 12,784,112 B2
(45) Date of Patent: Nov. 3, 2026

(54) SYSTEM WITH GRID DISPLAY TO FACILITATE UPDATE OF ELECTRONIC RECORD INFORMATION

(71) Applicant: Hartford Fire Insurance Company, Hartford, CT (US)

(72) Inventors: Thomas L. Harned, New Haven, CT (US); Matthew G. Rooney, West Hartford, CT (US); Sruthin Sugunan, Natick, MA (US)

(73) Assignee: HARTFORD FIRE INSURANCE COMPANY, Hartford, CT (US)

(*) Notice: Subject to any disclaimer, the term of this patent is extended or adjusted under 35 U.S.C. 154(b) by 0 days.

(21) Appl. No.: 19/073,702

(22) Filed: Mar. 7, 2025

(65) Prior Publication Data

US 2025/0209539 A1 Jun. 26, 2025

Related U.S. Application Data

(63) Continuation of application No. 16/520,891, filed on Jul. 24, 2019, now abandoned.

(51) Int. Cl.
*G06Q 40/08* (2012.01)
*G06F 16/28* (2019.01)

(52) U.S. Cl.
CPC .......... *G06Q 40/08* (2013.01); *G06F 16/287* (2019.01); *G06F 16/288* (2019.01)

(58) Field of Classification Search
CPC ...... G06Q 40/08; G06F 16/287; G06F 16/288
USPC .......... 705/4
See application file for complete search history.

(56) References Cited

U.S. PATENT DOCUMENTS

| | | | | |
|---|---|---|---|---|
| 2018/0165767 | A1* | 6/2018 | Faherty | G06Q 10/063114 |
| 2018/0293660 | A1* | 10/2018 | Rakshe | G06Q 40/08 |
| 2019/0318420 | A1* | 10/2019 | Summerson | G06Q 40/03 |

* cited by examiner

*Primary Examiner* — Ambreen A. Alladin
(74) *Attorney, Agent, or Firm* — Buckley, Maschoff & Talwalkar LLC

(57) ABSTRACT

A potential risk relationship data store may contain electronic records representing a plurality of potential risk relationships with an enterprise. An existing risk relationship data store may contain electronic records representing a plurality of existing risk relationships, of various types, between entities and the enterprise. A back-end application computer server may access information in the potential risk relationship data store and the existing risk relationship data store. The computer server may then transmit, to a first user device, a grid display of information about a subset of the electronic records in the potential risk relationship data store. Moreover, information about electronic records not in the subset is blocked from being transmitted to the first user device. The computer server may then receive, from the first remote user device, an annotation associated with a selected entity and store the received annotation such that it is accessible via a second user device.

22 Claims, 14 Drawing Sheets

1300

| CUSTOMER ID 1302 | CUSTOMER NAME 1304 | DATE/TIME 1306 | ANNOTATION 1308 | ... | ESTIMATED PREMIUM VALUE 1310 |
|---|---|---|---|---|---|
| C_10001 | ABC CORP | 08/23/2020 (11:20) | Do Not Pursue | | $50,000.00 |
| C_10002 | XYZ INC. | 01/23/2020 (13:25) | Pursue | | $27,000.00 |
| C_10003 | AMERICAN PRODUCTS | 9/27/2020 (08:30) | Do Not Pursue | | $35,000.00 |
| C_10004 | DR. JONES PEDIATRIC | 09/30/2020 (13:35) | Pursue | | $5,000.00 |

FIG. 13

SYSTEM WITH GRID DISPLAY TO FACILITATE UPDATE OF ELECTRONIC RECORD INFORMATION

CROSS REFERENCE TO RELATED APPLICATION

This is a continuation of U.S. patent application Ser. No. 16/520,891, entitled "SYSTEM WITH GRID DISPLAY TO FACILITATE UPDATE OF ELECTRONIC RECORD INFORMATION," filed Jul. 24, 2019, the entire contents of which are incorporated herein by reference for all purposes.

BACKGROUND

Electronic records, such as files and database entries, may be stored and utilized by an enterprise. For example, an insurance enterprise might access and update electronic records associated with potential and existing risk relationships (e.g., insurance relationships with customers). In some cases, information about existing customers may be helpful when exploring new relationships (e.g., to identify new entities who might be interested in entering into a new risk relationship with an enterprise). For example, an existing customer who already purchases workers' compensation insurance from an enterprise might be more likely to consider also purchasing another type of insurance (e.g., business insurance) from that enterprise. This information is typically compiled and stored on a spreadsheet application (e.g., such as the EXCEL® spreadsheet application available from Microsoft®). Manually identifying appropriate electronic records by an enterprise, however, can be a time consuming and expensive process-especially when a substantial number of electronic records (e.g., thousands of records) and/or a wide range of different types of information needs to be analyzed, aggregated, filtered, tagged, etc.

It would be desirable to provide systems and methods to access and update electronic record information in a way that provides faster, more accurate results.

SUMMARY OF THE INVENTION

According to some embodiments, systems, methods, apparatus, computer program code and means are provided to access and update electronic record information in a way that provides faster, more accurate results and that allow for flexibility and effectiveness when responding to those results. In some embodiments, a potential risk relationship data store may contain electronic records representing a plurality of potential risk relationships with an enterprise. An existing risk relationship data store may contain electronic records representing a plurality of existing risk relationships, of various types, between entities and the enterprise. A back-end application computer server may access information in the potential risk relationship data store and the existing risk relationship data store. The computer server may then transmit, to a first user device, a grid display of information about a subset of the electronic records in the potential risk relationship data store. Moreover, information about electronic records not in the subset is blocked from being transmitted to the first user device. The computer server may then receive, from the first remote user device, an annotation associated with a selected entity and store the received annotation such that it is accessible via a second user device.

Some embodiments comprise: means for accessing, by a back-end application computer server, information in a potential risk relationship data store containing electronic records that represent a plurality of potential risk relationships with the enterprise and, for each potential risk relationship, an electronic record identifier and a set of entity attribute values including an entity identifier; means for accessing, by the back-end application computer server, information in an existing risk relationship data store containing electronic records that represent a plurality of existing risk relationships, of various types, between entities and the enterprise; means for transmitting, to a first remote user device of a first user associated with the enterprise, a grid display of information about a subset of the electronic records in the potential risk relationship data store arranged by entity along a first grid axis and by existing risk relationship type along a second axis, wherein information about electronic records not in the subset is blocked from being transmitted to the first remote user device; means for receiving, from the first remote user device, an annotation associated with a selected entity; and means for storing the received annotation such that the annotation is accessible via a second remote user device of a second user associated with the enterprise.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to access and update electronic record information in a way that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 13 is a portion of a tabular potential risk relationship database according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record attribute access, update, and/or analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be accessed, updated (e.g., with tags or other annotations), and analyzed via a back-end application server to accurately improve the exchange of information, thus improving the overall efficiency of the system associated with message storage requirements and/or bandwidth considerations (e.g., by reducing the number of messages that need to be transmitted via a network). Moreover, embodiments associated with accessing and updating accurate, pertinent information might further improve client contact performance, sales of risk relationships, allocations of resources, electronic record processing decisions, etc.

Figure 1:
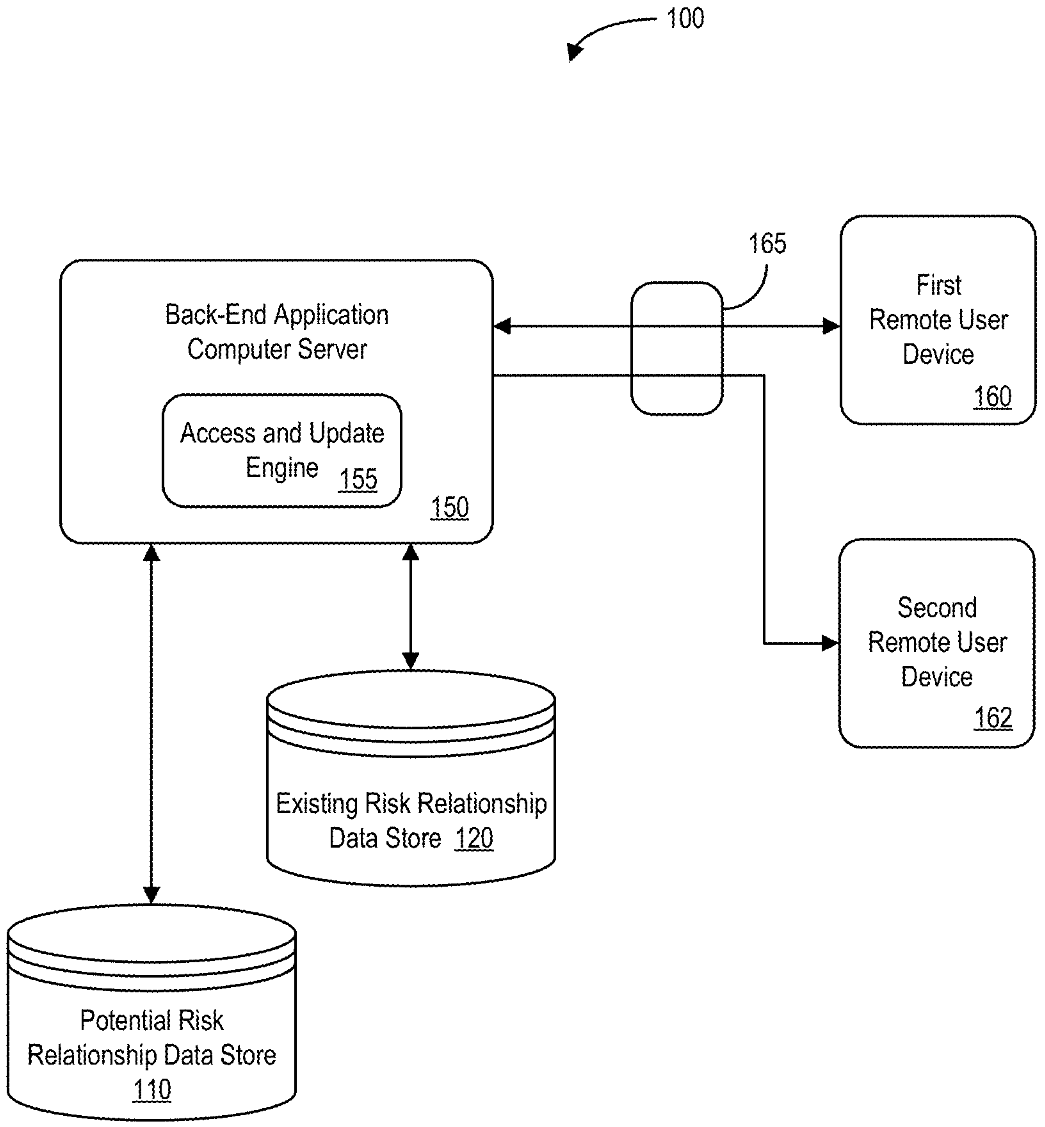
FIG. 1 is a high-level block diagram of a system in accordance with some embodiments.

FIG. 1 is a high-level block diagram of a system 100 according to some embodiments of the present invention. In particular, the system 100 includes a back-end application computer 150 server that may access information in a potential risk relationship data store 110 (e.g., storing a set of electronic records representing risk associations, each record including, for example, one or more risk relationship identifiers, attribute variables, resource values, etc.). The back-end application computer server 150 may also retrieve information from other data stores or sources, such as an existing risk relationship data store 120, in connection with an access and update engine 155 to view, analyze, and/or update the electronic records. The back-end application computer server 150 may also exchange information with a first remote user device 160 and a second remote user device 162 (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about a potential or existing association) and/or the remote user devices 160, 162. For example, the first remote user device 160 may transmit annotated and/or tagged information to the back-end application computer server 150. Based on the updated information, the back-end application computer server 150 may adjust data in the potential risk relationship data store 110 and the change may be viewable via the second remote user device 162. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the access and/or update of electronic records in the potential risk relationship data store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the potential risk relationship data store 110 and/or existing risk relationship data store 120. The data stores 110, 120 may be locally stored or reside remote from the back-end application computer server 150. As will be described further below, the potential risk relationship data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and an enterprise resource management server might be co-located and/or may comprise a single apparatus.

Figure 2:
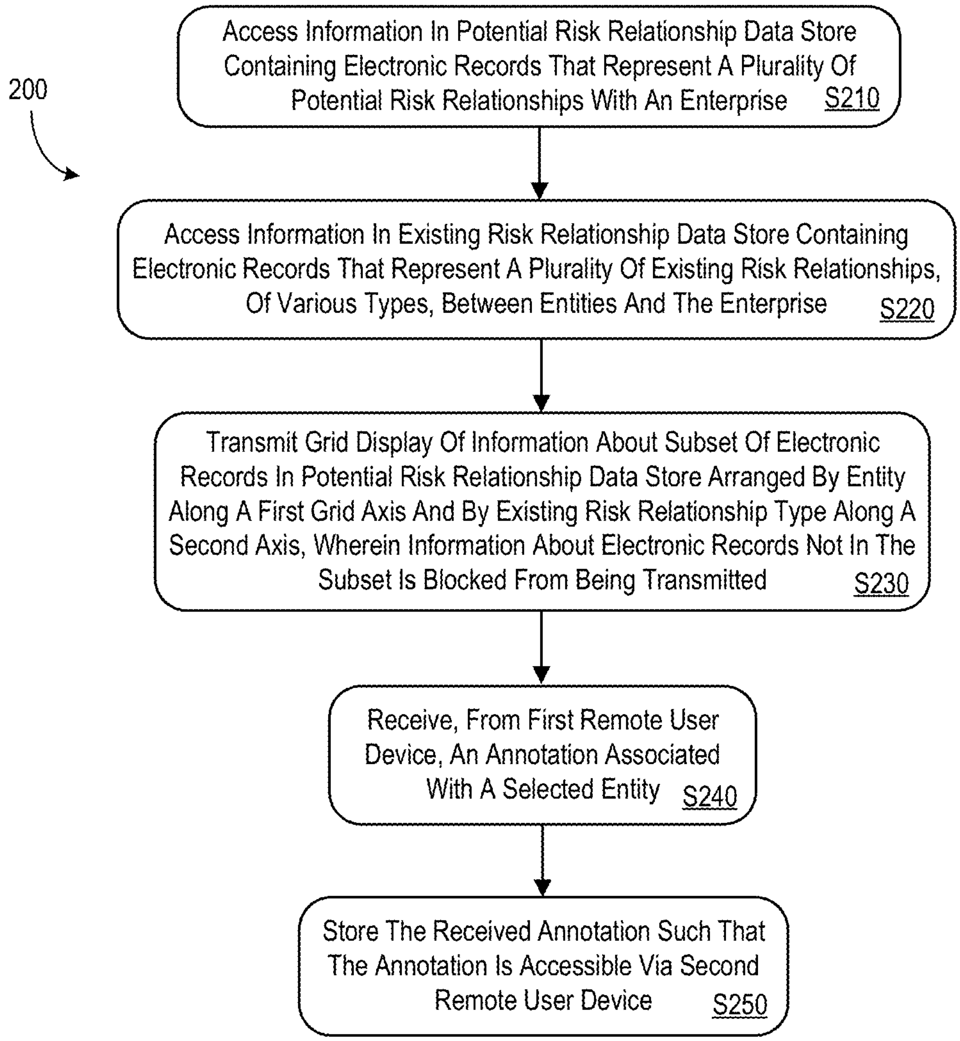
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may access information in a potential risk relationship data store containing electronic records that represent a plurality of potential risk relationships with an enterprise (e.g., potential customers of an insurance company). For each potential risk relationship, the potential risk relationship data store might include an electronic record identifier and a set of entity attribute values including an entity identifier. For example, entity attribute values in the potential risk relationship data store might include an entity name, an entity location, an entity address, entity contact information, entity industry information, an industry code, an industry description, an indication of whether or not the entity has an existing relationship with the enterprise, etc.

At S220, the back-end application computer server may access information in an existing risk relationship data store containing electronic records that represent a plurality of existing risk relationships, of various types, between entities and the enterprise (e.g., customers who currently purchase various types of insurance from an insurance company).

At S230, the system may transmit, to a first remote user device of a first user associated with the enterprise, a grid display of information about a subset of the electronic records in the potential risk relationship data store. The grid display might be arranged, for example, by entity along a first grid axis and by existing risk relationship type along a second axis. Note that information about electronic records not in the subset is blocked from being transmitted to the first remote user device. Such an approach may, for example, avoid sending data about all risk relationships to the first remote user device (e.g., which could potentially be misappropriated or otherwise misused by the first user).

According to some embodiments, entities are sorted along the first axis based on a concentration value calculated for each entity using information in the existing risk relationship data store. For example, the concentration value might indicate if the enterprise already has a "low," "medium," or "high" concentration for a particular type of insurance. In some embodiments, the grid display includes an icon, displayed along first axis and the second axis, representing a concentration value for each entity on a risk relationship type-by-type basis. For example, each icon might graphically represent a level of concentration via an icon color, an icon size, an icon shape (including a fill pattern), at least one alphanumeric character (e.g., a grade from "A" to "F"), etc.

At S240, the system may receive, from the first remote user device, an annotation associated with a selected entity. For example, the first user might "tag" certain entities to pursue with a follow-up communication. At S250, the system storing the received annotation such that the annotation is accessible via a second remote user device of a second user associated with the enterprise. For example, other employees of an insurance enterprise may see that a particular entity has (or has not) been tagged or otherwise annotated. According to some embodiments, receiving an indication of the selected entity from the first remote user device might cause the system to transmit additional entity attribute values associated with the selected entity to the first remote user device (e.g., a pop-up window may display additional details about the selected entity).

Figure 3:
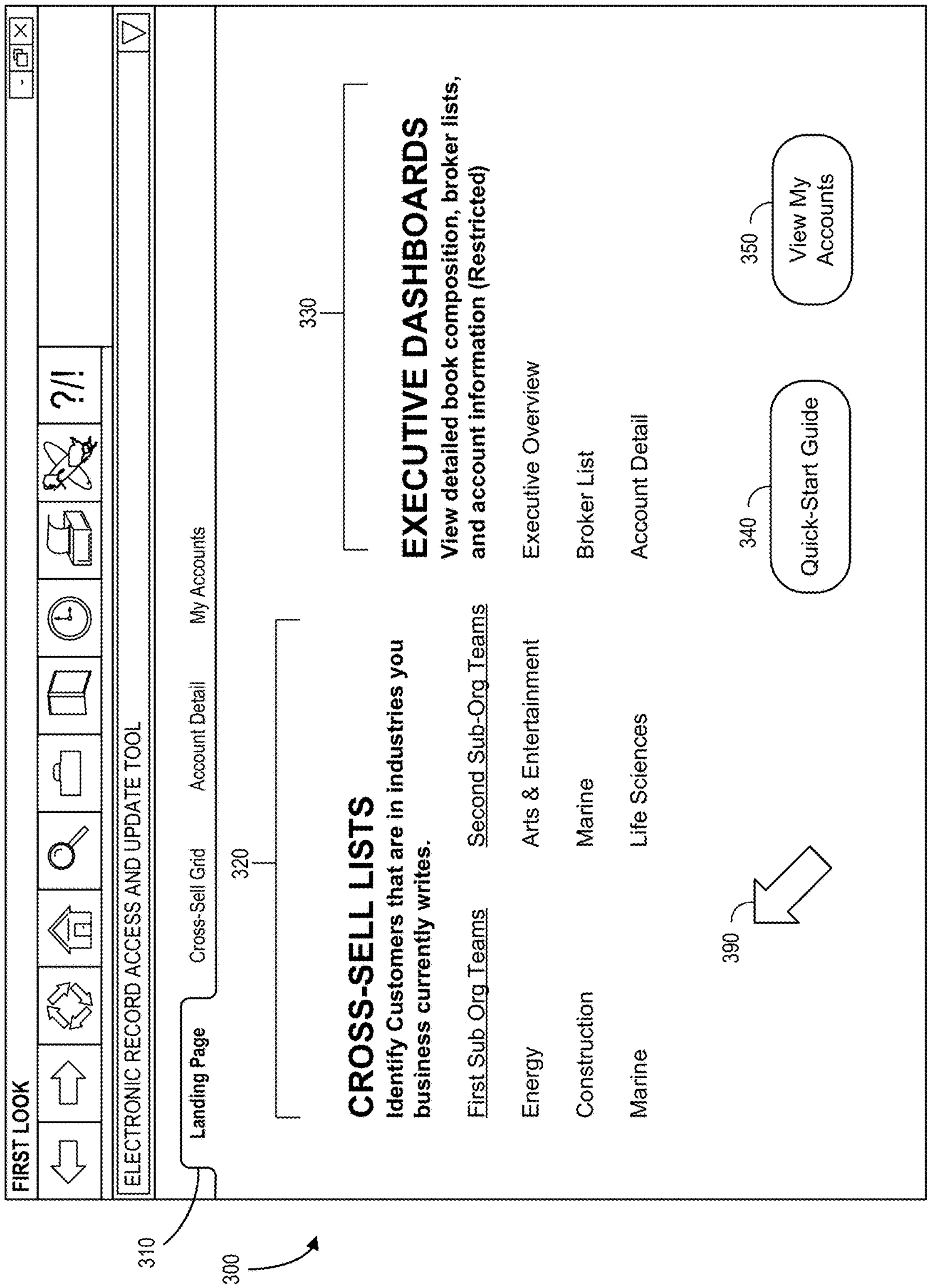
FIG. 3 is an example of a landing page display for an insurance policy cross-sell information access and update tool in accordance with some embodiments.

FIG. 3 is an example of a landing page display 300 for an insurance policy cross-sell information access and update tool in accordance with some embodiments. The landing page display 300 might comprise an initial view of tool and provide a navigation structure 310 and/or links to let the user access information in various ways. The links might include, for example, cross sell lists 320 for one or more sub-organizations associated with an enterprise. For each sub-organization, a list of insurance segment links may be provided (and selection of one of those links, e.g., via touchscreen or computer mouse pointer 390, may result in a grid display such as the one described in connection with FIG. 4). According to some embodiments, links for executive dashboards 330 may also be provided to those who are authorized to access that information. The display 300 may further include a quick-start guide icon 340 and/or a "view my accounts" icon 350 (e.g., resulting in a display such as the one described in connection with FIG. 10).

Figure 4:
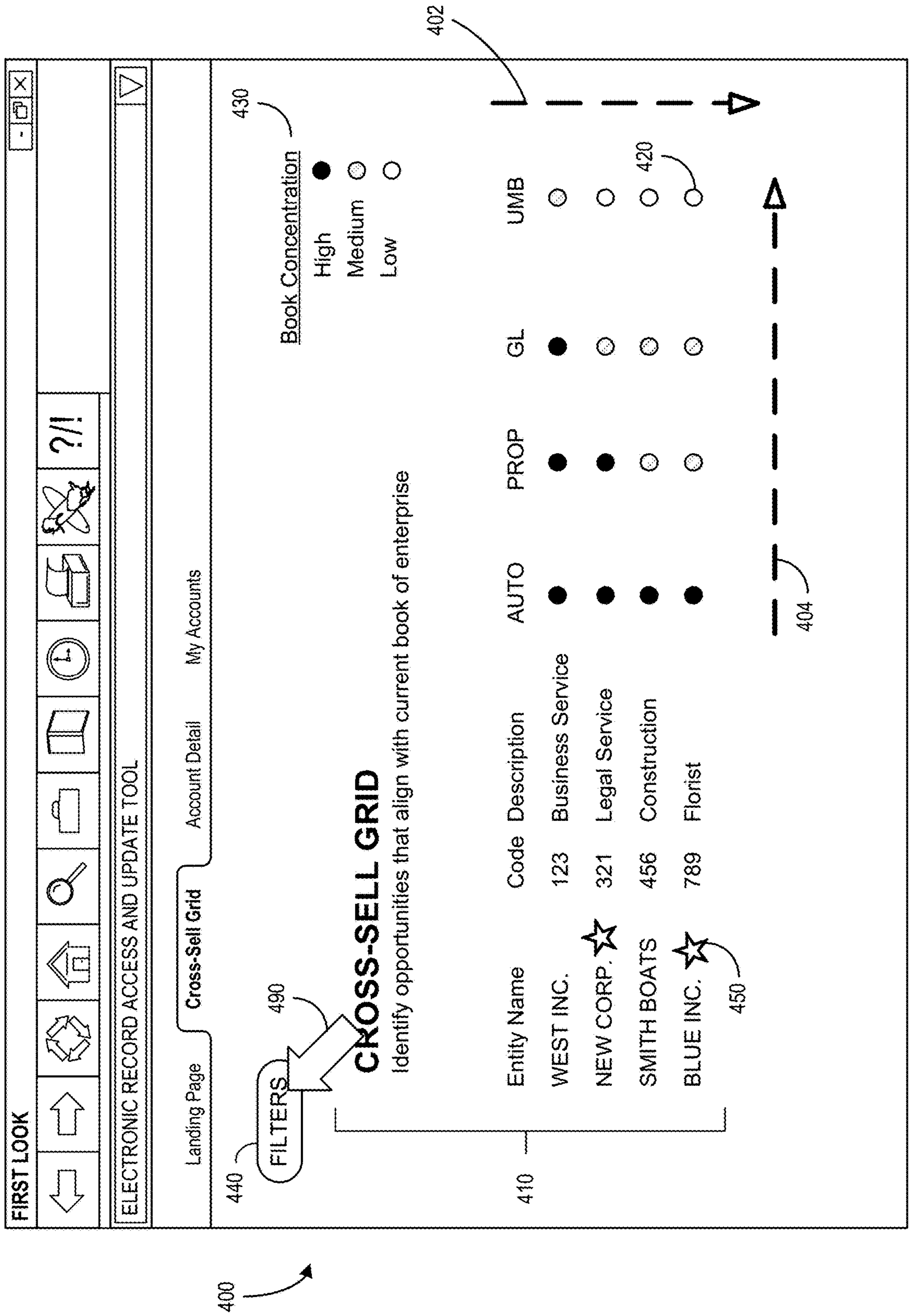
FIG. 4 is an example of a grid display according to some embodiments.

FIG. 4 is an example of a grid display 400 according to some embodiments. The display 400 includes a grid 410 arranged by entity along a first access 402 and by type of insurance along a second axis. A risk relationship type might include, for example, automobile insurance, property insurance, general liability insurance, umbrella insurance, workers' compensation insurance, special general liability insurance, etc. The grid 410 may help a user identify opportunities that align with a current book of business for an enterprise.

According to some embodiments, entities are sorted along the first axis 402 based on a concentration value calculated for each entity using information in the existing risk relationship data store. The concentration value might comprise, for example, a book concentration based on a line of business (e.g., an appetite based a number of insurance policies and/or) an overall total insurance premium value). In some embodiments, electronic records are excluded or suppressed from the subset of records included in the grid 410 based on historical insurance claim information associated with an entity, a risk score associated with an entity, a prior underwriting or renewal decision associated with an entity, etc. As illustrated in FIG. 4, the grid 410 includes icons 420 that represent book concentration as defined in a key display 430 (although three levels of concentration are illustrated in FIG. 3, embodiments might be associated with any other number of levels, including two levels, five levels, etc.). Moreover, an indication 450 may be provided if the enterprise already has a relationship with an entity (e.g., currently has an account with an insurer). The entities might be automatically arranged along with first axis 402 based on an industry (e.g., a Standard Industry Classification ("SIC") code, industry description, etc.).

Figure 5:
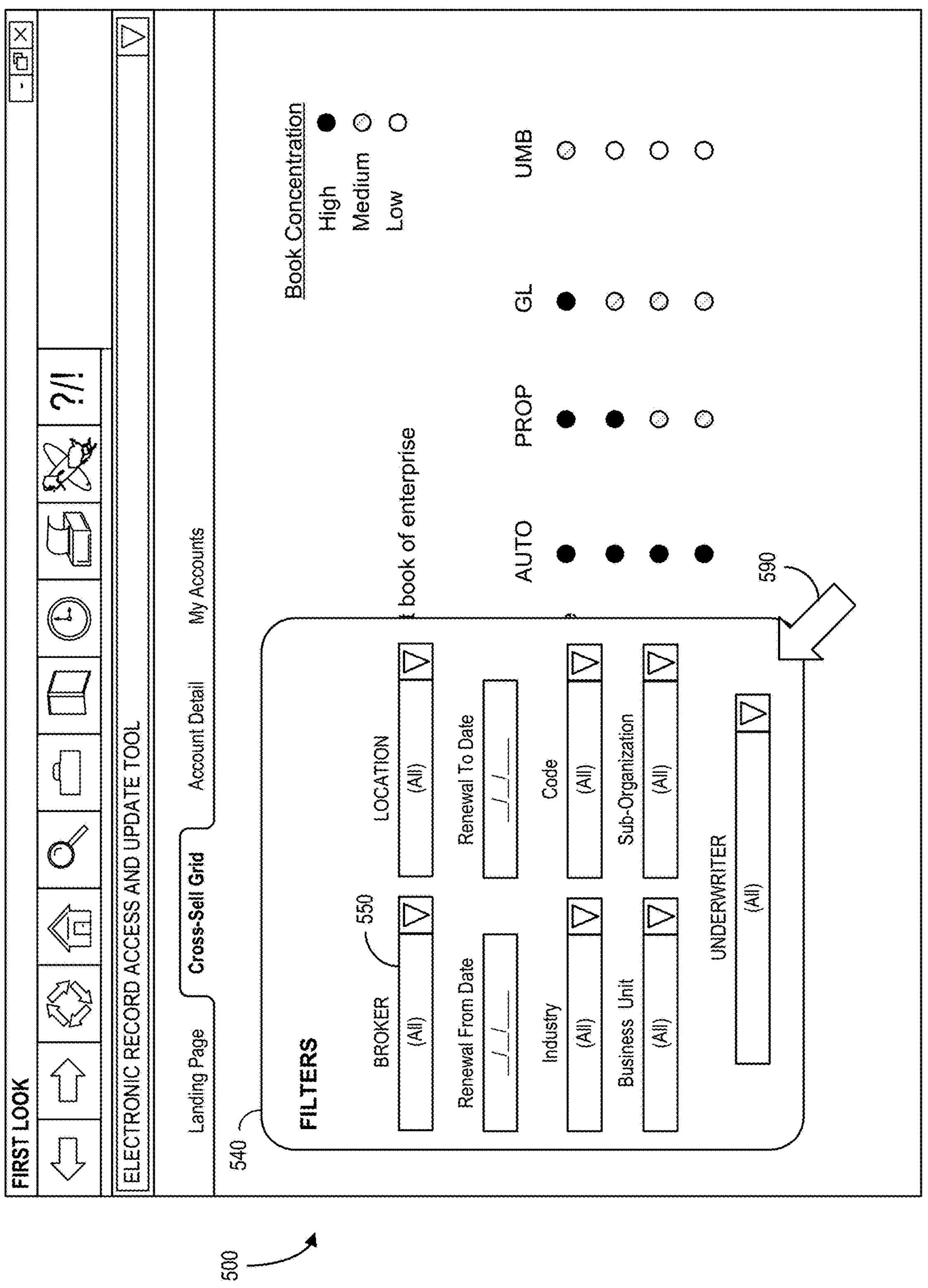
FIG. 5 is an example of a filter criteria display in accordance with some embodiments.

According to some embodiments, selection of a filter icon 440 (e.g., via pointer 490) might let a user provide at least one filter criteria from a first remote user device. The system may then apply the at least one filter criteria to the electronic records in the potential risk relationship data store and update the grid display 400 with a filtered subset of the electronic records in the potential risk relationship data store. For example, FIG. 5 is an example of a filter criteria display 500 in accordance with some embodiments. The display 500 may include a filter area 540 filter selections 550, such as one associated with an insurance broker identifier (e.g., which might be typed into a text search box or selected via a drop-down menu with a computer pointer 590), territory information (e.g., a region, state, or insurance company branch office), an insurance policy renewal date range, an industry, an industry code, an enterprise sub-organization, an underwriter identifier, etc.

Figure 6:
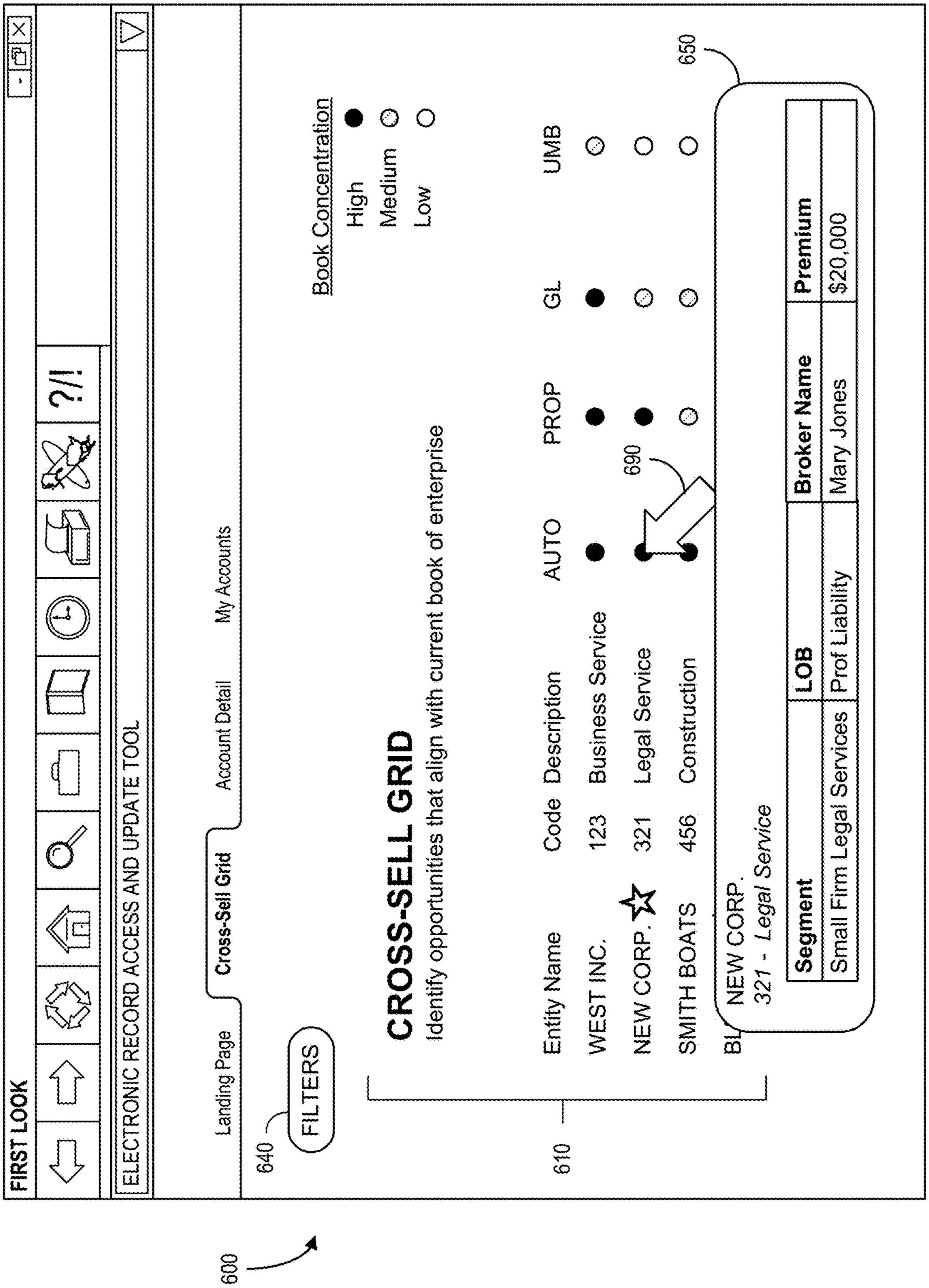
FIG. 6 is an example of an additional information display according to some embodiments.

According to some embodiments, selection of an entity in a grid (e.g., by "right clicking" a computer mouse, "hovering" over an icon with a pointer, etc.) may result in the display of additional information about that entity. For example, FIG. 6 is an example of an additional information display 600 where a computer mouse pointer 690 has selected an entity in a grid 610 according to some embodiments. Note that if filters 640 had previously been defined by the user (as described in connection with FIG. 5), the entities in the grid 610 might only include those that satisfy those criteria. According to some embodiments, additional information 650 might include, for example, a business segment, a line of business, a broker name, an insurance premium amount, an underwriter, an insurance policy expiration date, etc.

Figure 7:
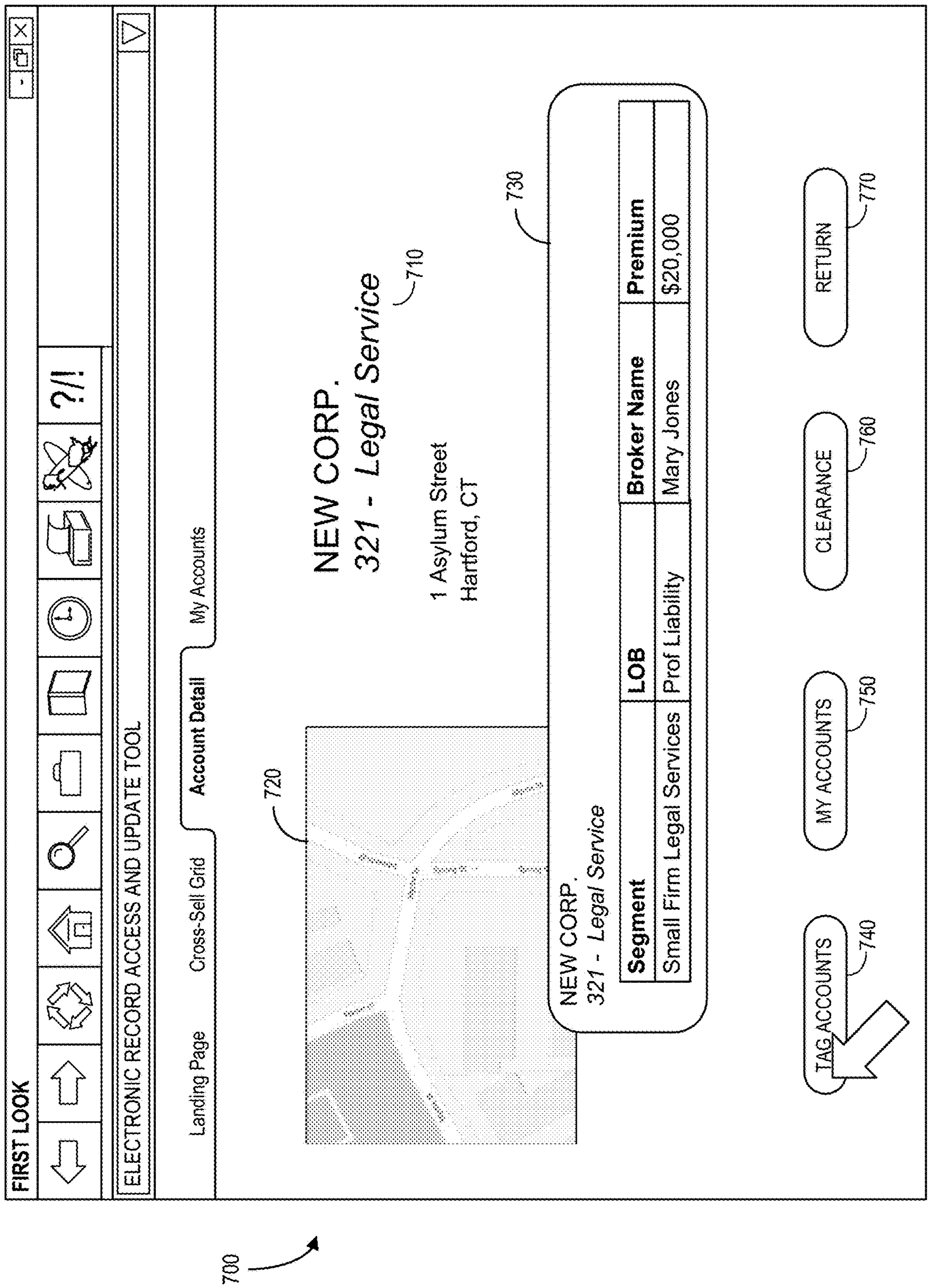
FIG. 7 is an example of an account detail view display in accordance with some embodiments.

FIG. 7 is an example of an account detail view display 700 in accordance with some embodiments. The account detail view display 700 might let a user identify and/or tag accounts for specific cross-sell opportunities. According to some embodiments, the display 700 includes an account identifier 710 (e.g., an account name, industry, postal address, etc.), map information 720 (e.g., including a photographic view of the entity address), and account details 730. The display 700 may also include a tag accounts icon 740 (e.g., described in connection with FIG. 7), a my accounts icon 750 (described in connection with FIG. 10), a clearance icon 760 (e.g., associated with an enterprise clearance tool to help ensure that the enterprise isn't already working with the entity in some way), and a return icon 770 (e.g., to access a prior display or user interface screen).

Figure 8:
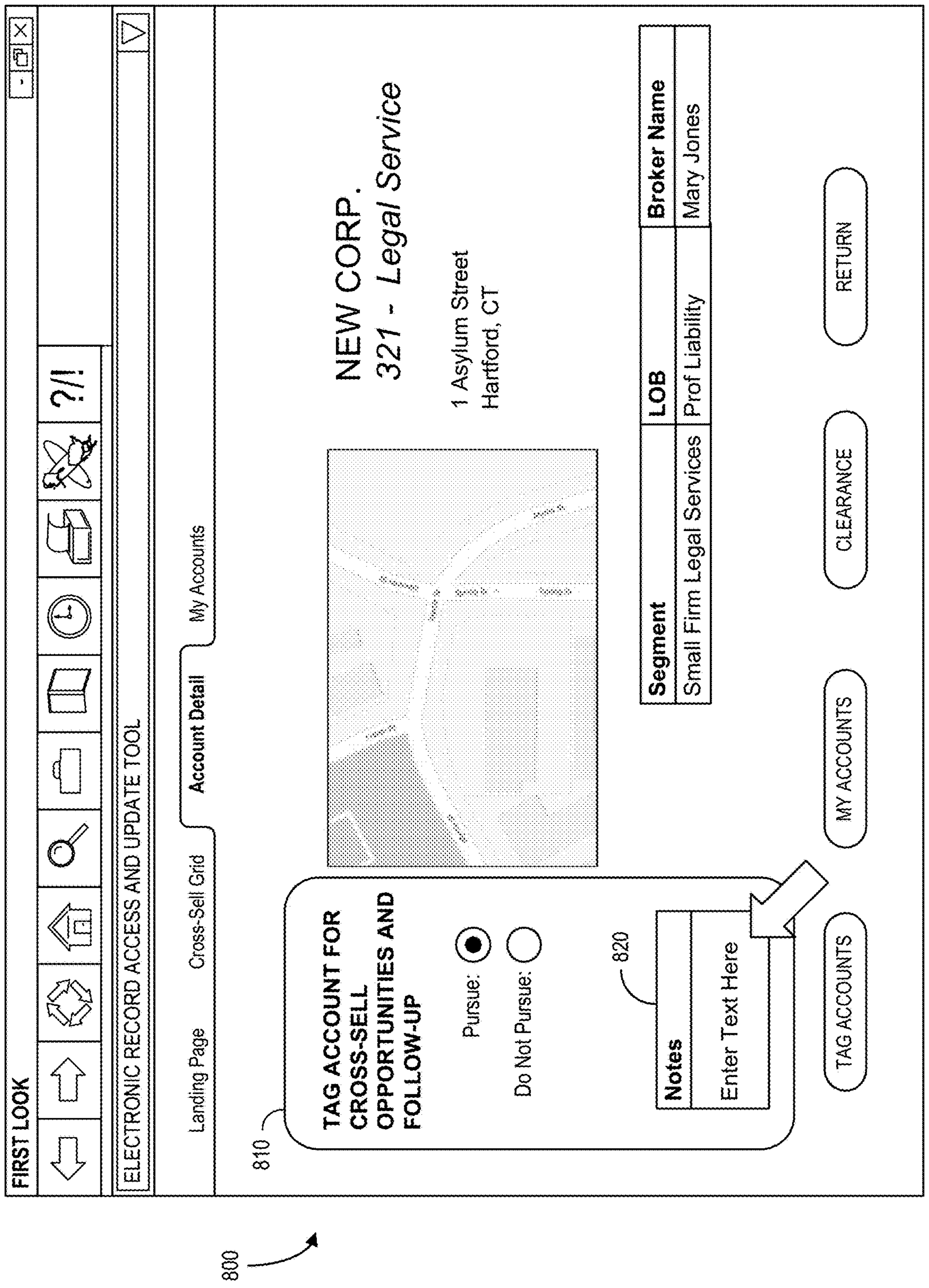
FIG. 8 is an example of an account annotation or tagging display according to some embodiments.
Figure 9:
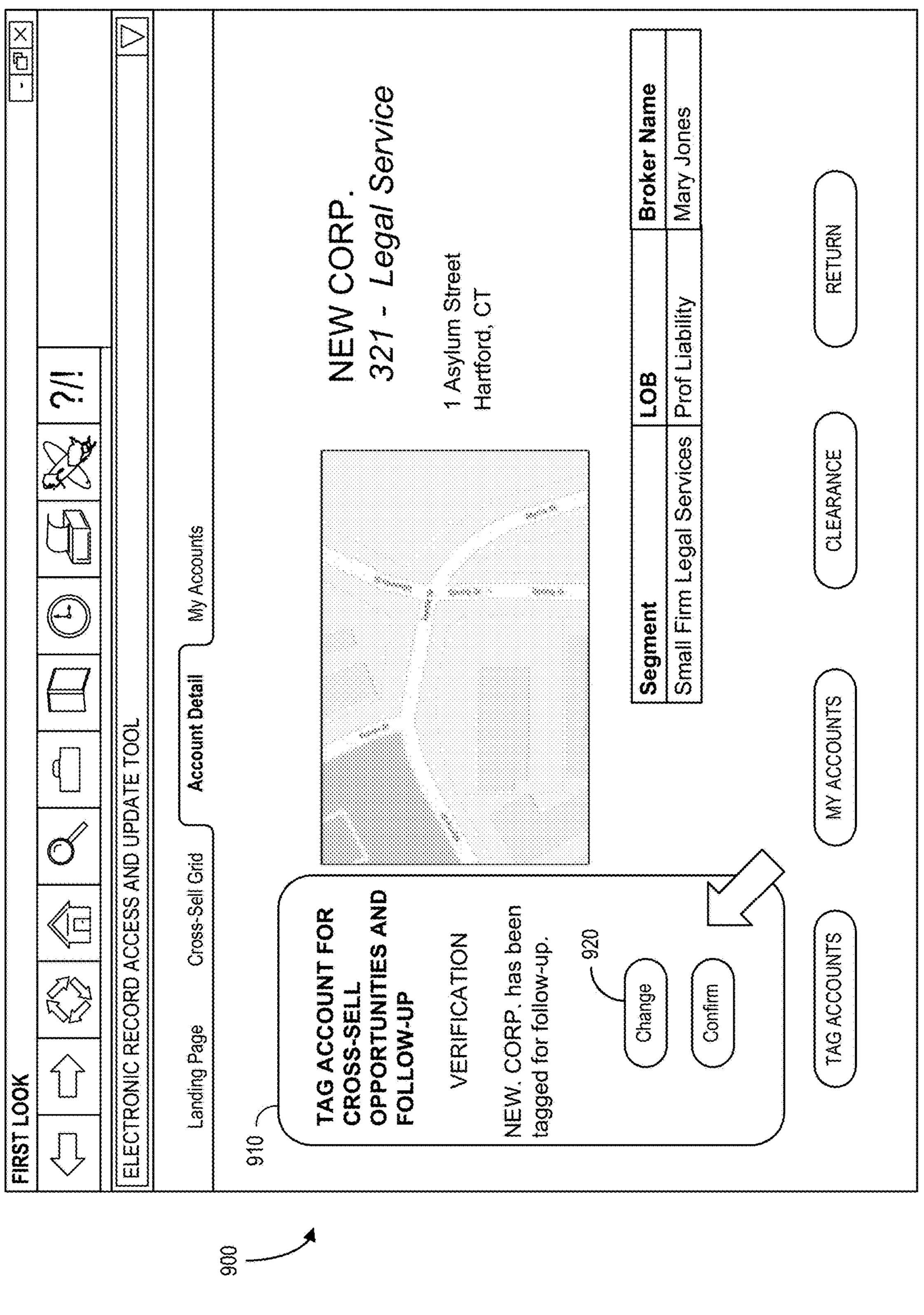
FIG. 9 is an example of a verification display in accordance with some embodiments.

FIG. 8 is an example of an account annotation or tagging display 800 according to some embodiments. In particular, the display 800 includes an annotation area 810 where a user can indicate whether (or not) he or she is planning to pursue the entity with a follow-up communication (e.g., a sales call, email message, office visit, etc.). According to some embodiments, the user may also enter text notes 820, attach files (e.g., image or sound files, relevant documentation or questionnaires, etc.). Note that information provided via annotation area 810 may be viewable by other users (e.g., to help avoid multiple enterprise employees from contacting the same entity). Once the information is entered into the annotation area 810, the system may verify that the data should be saved. For example, FIG. 9 is an example of a verification display 900 in accordance with some embodiments. Here, a verification display 910 summarizes the changes that have been made by the user, who can then use icons 920 to change or confirm the entry.

Figure 10:
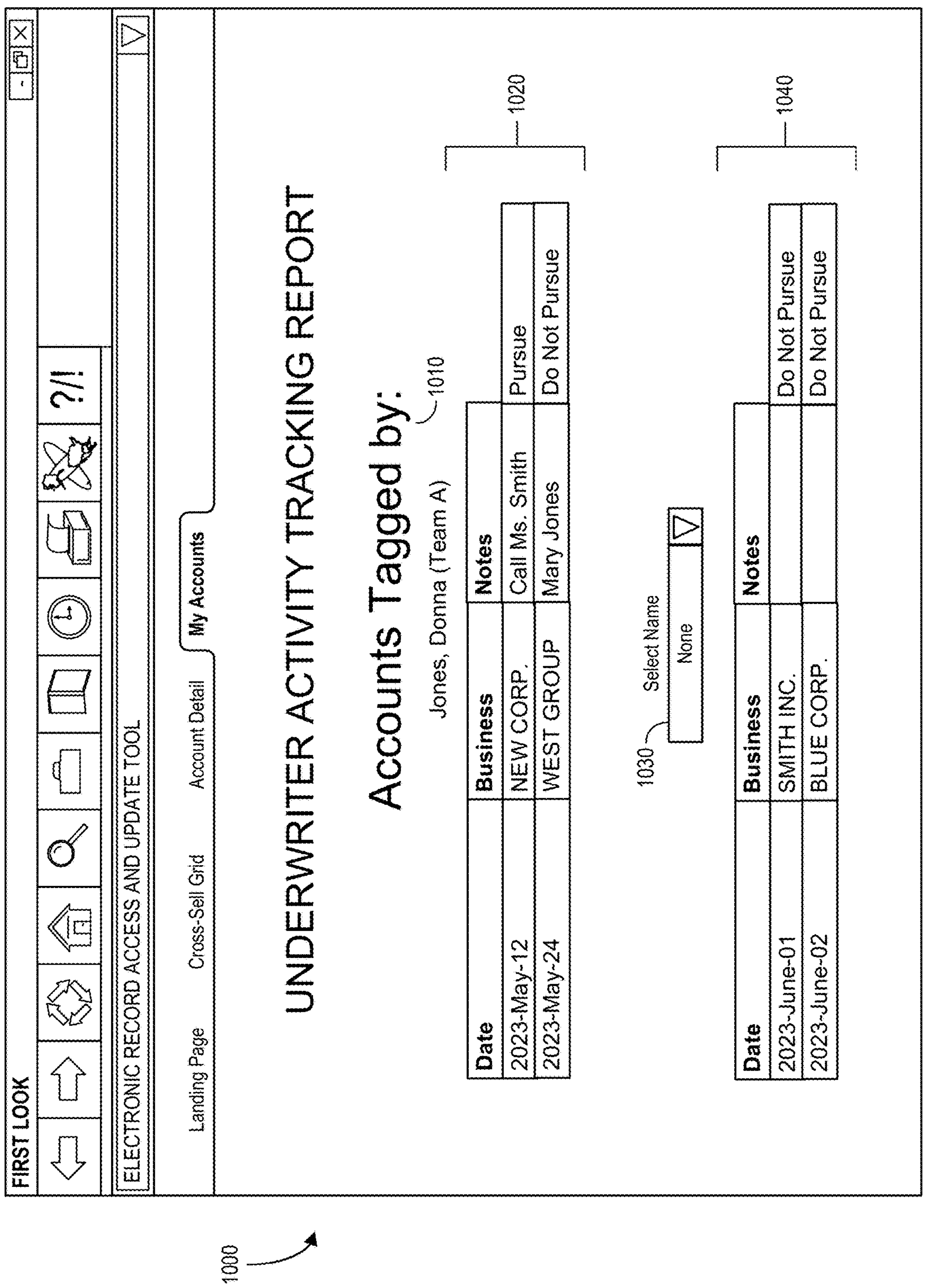
FIG. 10 is an example of an underwriting activity tracking report display according to some embodiments.

FIG. 10 is an example of an underwriting activity tracking report display 1000 according to some embodiments. The display 1000 might include entity details 1020 for accounts tagged by specific users 1010 or teams of users (e.g., including a date the entity was tagged, a business name or identifier, relevant notes, an indication if the entity will be pursued, a line of business, etc.). The display 1000 might also include information 1040 associated with a selected underwriter or other employee 1030.

Figure 11:
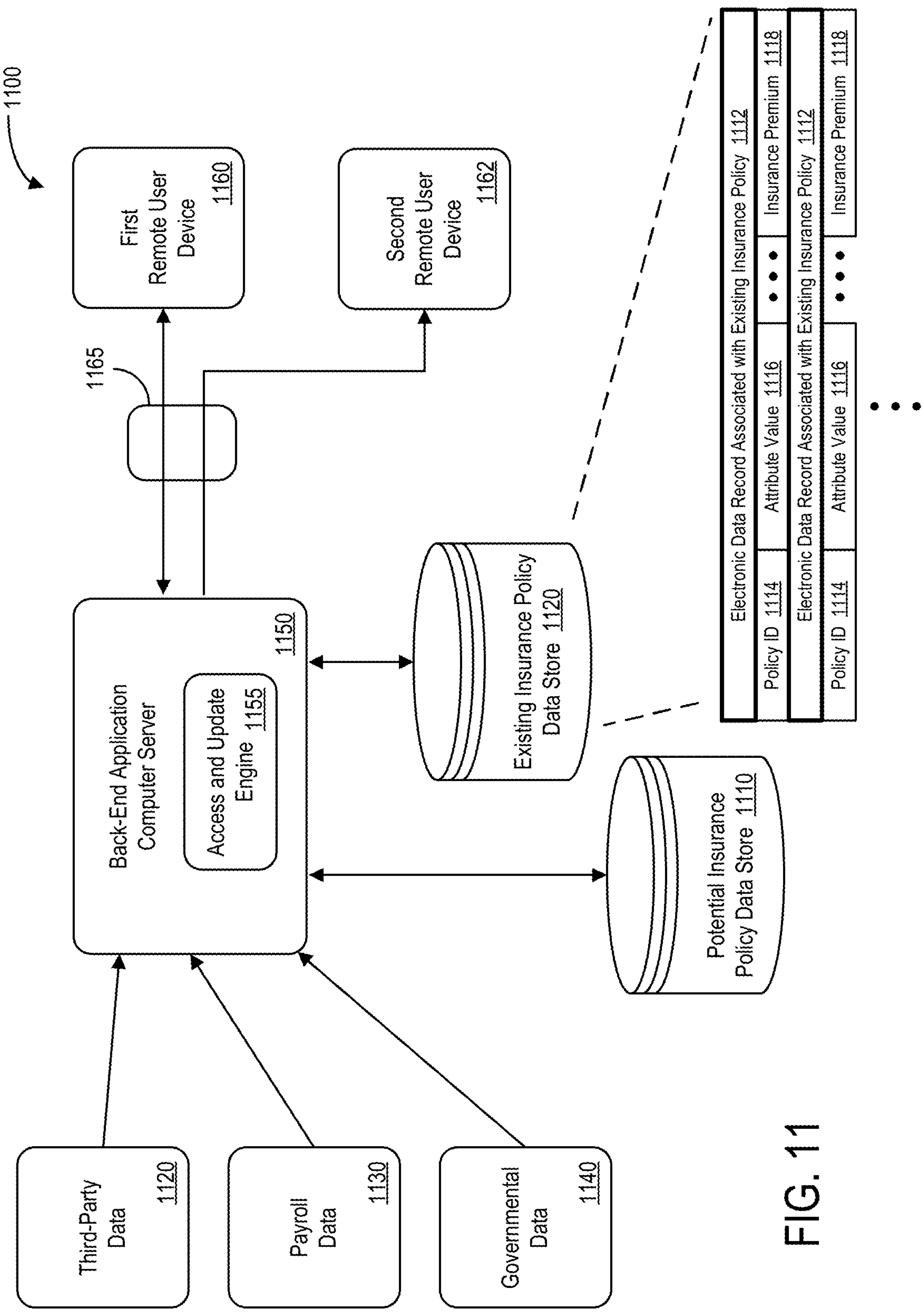
FIG. 11 is a more detailed block diagram of a system according to some embodiments.

FIG. 11 is a more detailed block diagram of a system 1100 according to some embodiments. As before, the system 1100 includes a back-end application computer server 1150 that may access information in a potential insurance policy data store 1110 and an existing insurance policy data store 1120 (e.g., storing a set of electronic records 1112 representing insurance policies, each record including, for example, one or more insurance policy identifiers 1114, attribute variables 1116, insurance premiums 1118, etc.). The back-end application computer server 1150 may also retrieve information from other data stores or sources in connection with an access and update engine 1155 to access, verify, analyze, and/or update the electronic records. The back-end application computer server 1150 may also exchange information with remote user devices 1160, 1662 (e.g., via a firewall 1165). According to some embodiments, an interactive graphical user interface platform of the back-end application computer server may facilitate forecasts, decisions, predictions, and/or the display of results via one or more remote administrator computers (e.g., to gather additional information about an existing or potential association) and/or the remote user devices 1160, 1162.

According to some embodiments, the back-end application computer server 1150 may also receive external information, such as third-party data 1120, payroll data 1130, governmental data 1140, credit score data (e.g., associated with a level of risk), map or search result data, and social media data (e.g., a number of friends or likes on a web site). This data might be used, for example, to pre-populate fields in the potential risk relationship data store 1110. A user may then review the information via remote user devices 1160, 1162 and transmit updated information to the back-end application computer server 1150 (e.g., by tagging an entity). Based on the updated information, the back-end application computer server 1150 may adjust data in the potential insurance policy data store 1110 and make that information available to other employees of an enterprise as appropriate. According to some embodiments, the back-end application computer server 1150 may transmit information to an email server, workflow application, a chatbot text interface, a streaming video interface, a voice recognition application, or a calendar function (e.g., to generate reminders that an entity should be contacted). This information might be used by the system 1100, for example, to automatically establish a channel of communication with an entity, automatically transmit a message to an entity, etc. Similarly, the back-end application computer server 1150 might transmit updated electronic records 1112 to an underwriter device for manual review and a determination of a proposed or approximate insurance premium.

Figure 12:
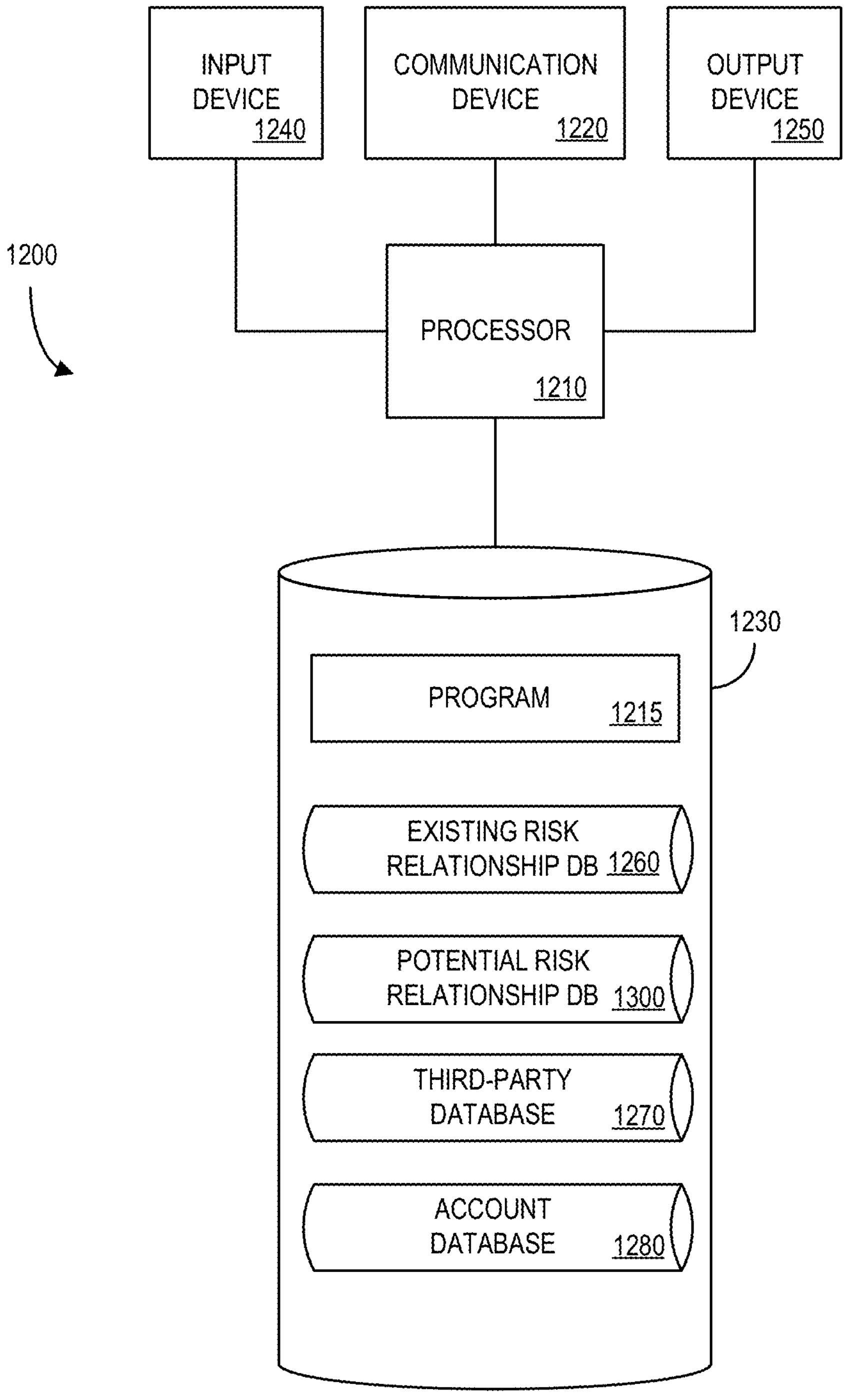
FIG. 12 is a block diagram of an apparatus in accordance with some embodiments of the present invention.

The embodiments described herein may be implemented using any number of different hardware configurations. For example, FIG. 12 illustrates an apparatus 1200 that may be, for example, associated with the systems 100, 1100 described with respect to FIGS. 1 and 11, respectively. The apparatus 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote administrator computers and or communication devices (e.g., PCs and smartphones). Note that communications exchanged via the communication device 1220 may utilize security features, such as those between a public internet user and an internal network of the insurance enterprise. The security features might be associated with, for example, web servers, firewalls, and/or PCI infrastructure. The apparatus 1200 further includes an input device 1240 (e.g., a mouse and/or keyboard to enter information about potential customers, etc.) and an output device 1250 (e.g., to output reports regarding insurance appetite, likely future sales results, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or a risk evaluation tool or application for controlling the processor 1210. The processor 1210 performs instructions of the program 1215, and thereby operates in accordance with any of the embodiments described herein. For example, the processor 1210 may access information about potential risk relationships data store and existing risk relationships. The processor 1210 may then transmit, to a first user device, a grid display of information about a subset of the electronic records in the potential risk relationship data store. Moreover, information about electronic records not in the subset is blocked by the processor 1210 from being transmitted to the first user device. The processor 1210 may then receive, from the first remote user device, an annotation associated with a selected entity and store the received annotation such that it is accessible via a second user device.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the back-end application computer server 1200 from another device; or (ii) a software application or module within the back-end application computer server 1200 from another software application, module, or any other source.

In some embodiments (such as shown in FIG. 12), the storage device 1230 further stores an existing risk relationship database 1260, a potential risk relationship database 1300, a third-party database 1270 (e.g., storing a list of business address and phone numbers that may be used to pre-populate fields on a cross-selling tool), and an account database 1280 (e.g., storing business appetite information, concentration values, etc.). An example of a database that might be used in connection with the apparatus 1200 will now be described in detail with respect to FIG. 13. Note that the database described herein is only an example, and additional and/or different information may be stored therein. Moreover, various databases might be split or combined in accordance with any of the embodiments described herein. For example, the potential risk relationship database 1300 and account database 1280 might be combined and/or linked to each other within the program 1215.

Referring to FIG. 13, a table is shown that represents the potential risk relationship database 1300 that may be stored at the apparatus 1300 according to some embodiments. The table may include, for example, entries associated with insurance policies that might be sold by an enterprise in the future. The table may also define fields 1302, 1304, 1306, 1308, 1310 for each of the entries. The fields 1302, 1304, 1306, 1308, 1310 may, according to some embodiments, specify: a customer identifier 1302, a customer name 1304, a date and time 1306, an annotation 1308, and an estimated premium value 1310. The potential risk relationship database 1300 may be created and updated, for example, based on information electrically received from various computer systems, including those associated with an insurance enterprise.

The customer identifier 1302 may be, for example, a unique alphanumeric code identifying a customer who might be interested in purchasing an insurance policy. The customer name 1304 may be associated with the potential insured, and the date and time 1306 might indicate when a tag was assigned to the customer. The database 1300 may store various attributes associated with the customer, such as a number of employees, income information, overtime information, etc. The potential risk relationship database 1300 may also store annotation information 1308 (e.g., indicating if the customer has been tagged with "pursue," "do not pursue," no tag, etc. The information in the potential risk relationship database 1300 may also be used to generate an estimated adjusted premium value 1310 that can be discussed with the potential customer.

Thus, embodiments may provide an automated and efficient way to access and update electronic record information in a way that provides faster, more accurate results. Embodiments may also provide an ability to access and interpret data in a holistic, tactical fashion. According to some embodiments, the system may agnostic regarding particular web browsers, sources of information, etc. For example, information from multiple sources (e.g., an internal insurance policy database and an external data store) might be blended and combined (with respect to reading and/or writing operations) so as to appear as a single "pool" of information to a user at a remote device. Moreover, embodiments may be implemented with a modular, flexible approach such that deployment of a new system for an enterprise might be possible in as little as one or two months.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
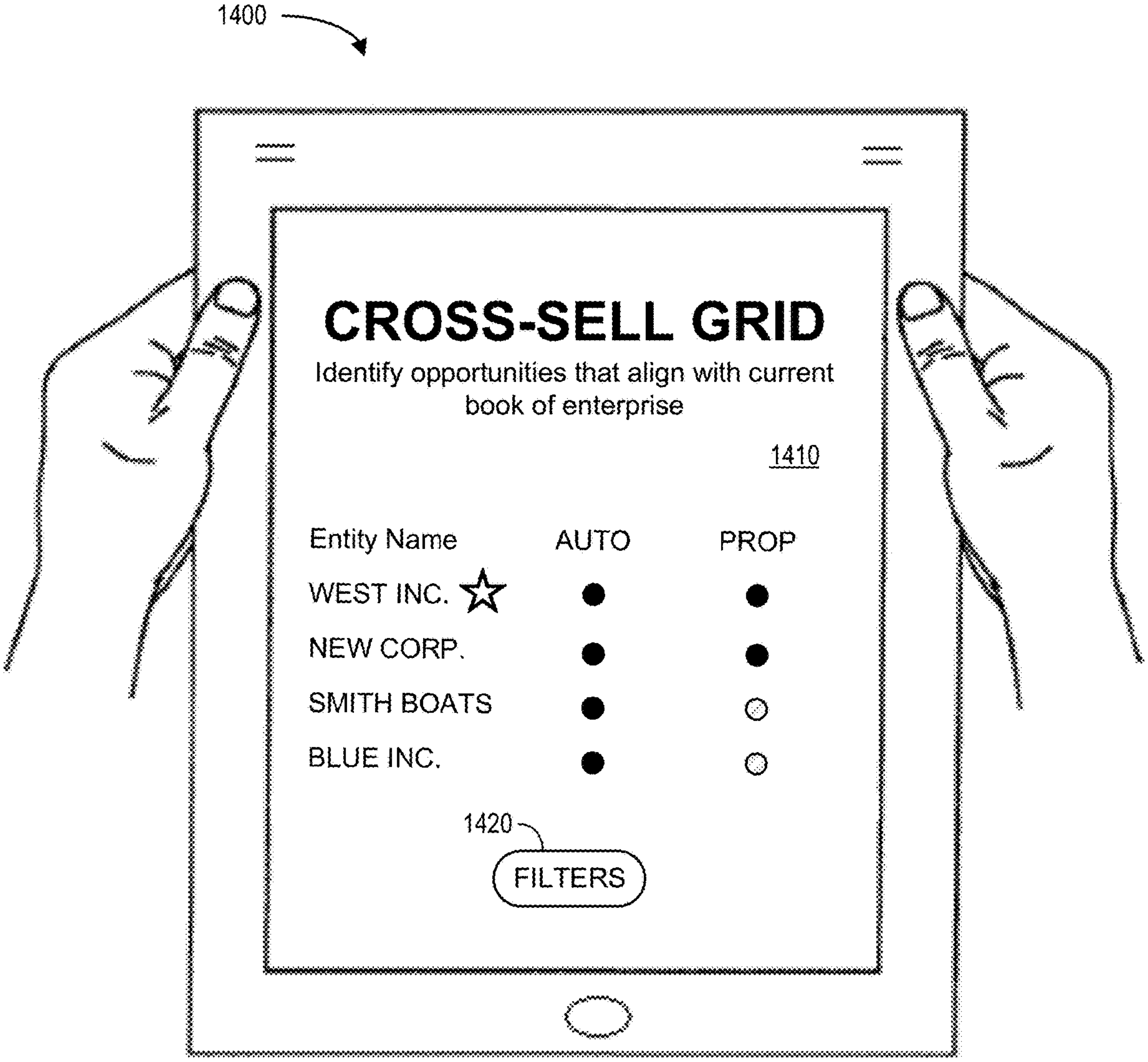
FIG. 14 illustrates a tablet computer displaying a grid display user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 14 illustrates a handheld tablet computer 1400 showing a cross-selling grid display 1410 according to some embodiments. The cross-selling grid display 1410 might include user-selectable data that can be selected and/or modified by a user of the handheld computer 1400 (e.g., via a filter icon 1420) to view updated information associated with an insurance enterprise.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to access and update electronic record information via a back-end application computer server of an enterprise, comprising:

(a) a potential risk relationship data store containing electronic records that represent a plurality of potential risk relationships with the enterprise and, for each potential risk relationship, an electronic record identifier and a set of entity attribute values including an entity identifier;

(b) an existing risk relationship data store containing electronic records that represent a plurality of existing risk relationships, of various types, between entities and the enterprise;

(c) the back-end application computer server, coupled to the potential risk relationship data store, including:

a computer processor, and a computer memory coupled to the computer processor and storing instructions that, when executed by the computer processor, cause the back-end application computer server to:

determine authorization access to one or more suppressible electronic records of the electronic records;

identify one or more electronic records of the one or more suppressible electronic records as inaccessible based on the determined authorization access;

block the identified one or more inaccessible electronic records from transmission to a user interface display;

generate the user interface display including a link to access a subset of the one or more suppressible electronic records, the subset excluding the blocked one or more inaccessible electronic records;

receive selection, via touch screen or computer mouse pointer, of the link on the user interface display and in response to the received selection, access information in the potential risk relationship data store and the existing risk relationship data store;

generate a first grid display including the subset of electronic records, avoiding transmission of data about all risk relationships;

transmit, to a first remote user device of a first user associated with the enterprise, a grid display of information about the subset of the electronic records in the potential risk relationship data store arranged by entity along a first grid axis and by existing risk relationship type along a second axis, wherein information in the blocked electronic records is blocked from being transmitted to the first remote user device to avoid misappropriation and misuse of the blocked data;

receive, from the first remote user device, an annotation associated with a selected entity; and store the received annotation such that the annotation is accessible via a second remote user device of a second user associated with the enterprise; and (d) a communication device coupled to the back-end application computer server to facilitate a transmission of data with the first and second remote user devices to support interactive user interface displays via a distributed communication network.

2. The system of claim 1, wherein entities are sorted along the first axis based on a concentration value calculated for each entity using information in the existing risk relationship data store.

3. The system of claim 2, wherein the grid display includes an icon, displayed along first axis and the second axis, representing a concentration value for each entity on a risk relationship type-by-type basis.

4. The system of claim 3, wherein each icon graphically represents a level of concentration via: (i) an icon color, (ii) an icon size, (iii) an icon shape, and (iv) at least one alphanumeric character.

5. The system of claim 1, wherein entity attribute values in the potential risk relationship data store include at least one of: (i) an entity name, (ii) an entity location, (iii) an entity address, (iv) entity contact information, (v) entity industry information, (vi) an industry code, (vii) an industry description, and (viii) an indication of whether or not the entity has an existing relationship with the enterprise.

6. The system of claim 1, wherein the backend application computer server is further programmed to:

receive an indication of the selected entity from the first remote user device, and responsive to the received indication, transmitting additional entity attribute values associated with the selected entity to the first remote user device.

7. The system of claim 1, wherein the backend application computer server is further programmed to:

receive at least one filter criteria from the first remote user device, apply the at least one filter criteria to the electronic records in the potential risk relationship data store, and update the grid display with a filtered subset of the electronic records in the potential risk relationship data store.

8. The system of claim 7, wherein the existing risk relationships comprise insurance policies.

9. The system of claim 8, wherein the existing risk relationship types include at least one of: (i) automobile insurance, (ii) property insurance, (iii) general liability insurance, (iv) umbrella insurance, (v) workers' compensation insurance, and (vi) special general liability insurance.

10. The system of claim 8, wherein the at least one filter criteria includes at least one of: (i) an insurance broker identifier, (ii) territory information, (iii) an insurance policy renewal date range, (iv) an industry, (v) an industry code, (vi) an enterprise sub-organization, and (vii) an underwriter identifier.

11. The system of claim 8, wherein entities are sorted along the first axis based on a concentration value calculated for each entity using information in the existing risk relationship data store including at least one of: (i) a number of insurance policies, and (ii) an overall total insurance premium value.

12. The system of claim 8, wherein electronic records are excluded from the subset of records included in the grid display based on at least one of: (i) historical insurance claim information associated with an entity, (ii) a risk score associated with an entity, and (iii) a prior underwriting or renewal decision associated with an entity.

13. The system of claim 1, wherein information from the potential risk relationship data store is supplemented with at least one of: (i) third-party data, (ii) governmental data, (iii) payroll data, (iv) credit score data, and (v) social media information.

14. The system of claim 1, wherein the back-end application server is further programmed to utilize at least one of: (i) automatically generated email reminders, (ii) automatically generated text message reminders, (iii) a chatbot text interface, (iv) a streaming video interface, and (v) voice recognition.

15. A computerized method to access and update electronic record information via a back-end application computer server of an enterprise, comprising:

accessing, by a back-end application computer server, information in a potential risk relationship data store containing electronic records that represent a plurality of potential risk relationships with the enterprise and, for each potential risk relationship, an electronic record identifier and a set of entity attribute values including an entity identifier, wherein the electronic records include one or more suppressible electronic records;

determining authorization access to one or more suppressible electronic records;

identifying one or more electronic records of the one or more suppressible electronic records as inaccessible based on the determined authorization access;

blocking the identified one or more inaccessible electronic records from transmission to a user interface display;

generating the user interface display including a link to access a subset of the one or more suppressible electronic records, the subset excluding the blocked one or more inaccessible electronic records;

receiving selection of the link on the user interface display and, in response to the received selection, accessing, by the back-end application computer server, information in an existing risk relationship data store containing electronic records that represent a plurality of existing risk relationships, of various types, between entities and the enterprise;

transmitting, to a first remote user device of a first user associated with the enterprise, a grid display of information about the subset of the electronic records in the potential risk relationship data store arranged by entity along a first grid axis and by existing risk relationship type along a second axis, wherein information in the blocked electronic records is blocked from being transmitted to the first remote user device to avoid misappropriation and misuse of the blocked data;

receiving, from the first remote user device, an annotation associated with a selected entity; and storing the received annotation such that the annotation is accessible via a second remote user device of a second user associated with the enterprise.

16. The method of claim 15, wherein entities are sorted along the first axis based on a concentration value calculated for each entity using information in the existing risk relationship data store.

17. The method of claim 16, wherein the grid display includes an icon, displayed along first axis and the second axis, representing a concentration value for each entity on a risk relationship type-by-type basis.

18. The method of claim 17, wherein each icon graphically represents a level of concentration via: (i) an icon color, (ii) an icon size, (iii) an icon shape, and (iv) at least one alphanumeric character.

19. A non-tangible, computer-readable medium storing instructions, that, when executed by a processor, cause the processor to perform a method to access and update electronic record information via a back-end application computer server of an enterprise, the method comprising:

accessing, by a back-end application computer server, information in a potential risk relationship data store containing electronic records that represent a plurality of potential risk relationships with the enterprise and, for each potential risk relationship, an electronic record identifier and a set of entity attribute values including an entity identifier;

determining authorization access to one or more suppressible electronic records;

identifying one or more electronic records of the one or more suppressible electronic records as inaccessible based on the determined authorization access;

blocking the identified one or more inaccessible electronic records from transmission to a user interface display;

generating the user interface display including a link to access a subset of the one or more suppressible electronic records, the subset excluding the blocked one or more inaccessible electronic records;

receiving selection of the link on the user interface display and, in response to the received selection, accessing, by the back-end application computer server, information in an existing risk relationship data store containing electronic records that represent a plurality of existing risk relationships, of various types, between entities and the enterprise;

transmitting, to a first remote user device of a first user associated with the enterprise, a grid display of information about a subset of the electronic records in the potential risk relationship data store arranged by entity along a first grid axis and by existing risk relationship type along a second axis, wherein information in the blocked electronic records is blocked from being transmitted to the first remote user device to avoid misappropriation and misuse of the blocked data;

receiving, from the first remote user device, an annotation associated with a selected entity; and storing the received annotation such that the annotation is accessible via a second remote user device of a second user associated with the enterprise.

20. The medium of claim 19, wherein the existing risk relationships comprise insurance policies.

21. The medium of claim 20, wherein the existing risk relationship types include at least one of: (i) automobile insurance, (ii) property insurance, (iii) general liability insurance, (iv) umbrella insurance, (v) workers' compensation insurance, and (vi) special general liability insurance.

22. The medium of claim 19, wherein entities are sorted along the first axis based on a concentration value calculated for each entity using information in the existing risk relationship data store including at least one of: (i) a number of insurance policies, and (ii) an overall total insurance premium value.

* * * * *